A. S. DIXON.
COTTON PACKER.
APPLICATION FILED NOV. 13, 1909.
960,850.
Patented June 7, 1910.
2 SHEETS—SHEET 1.
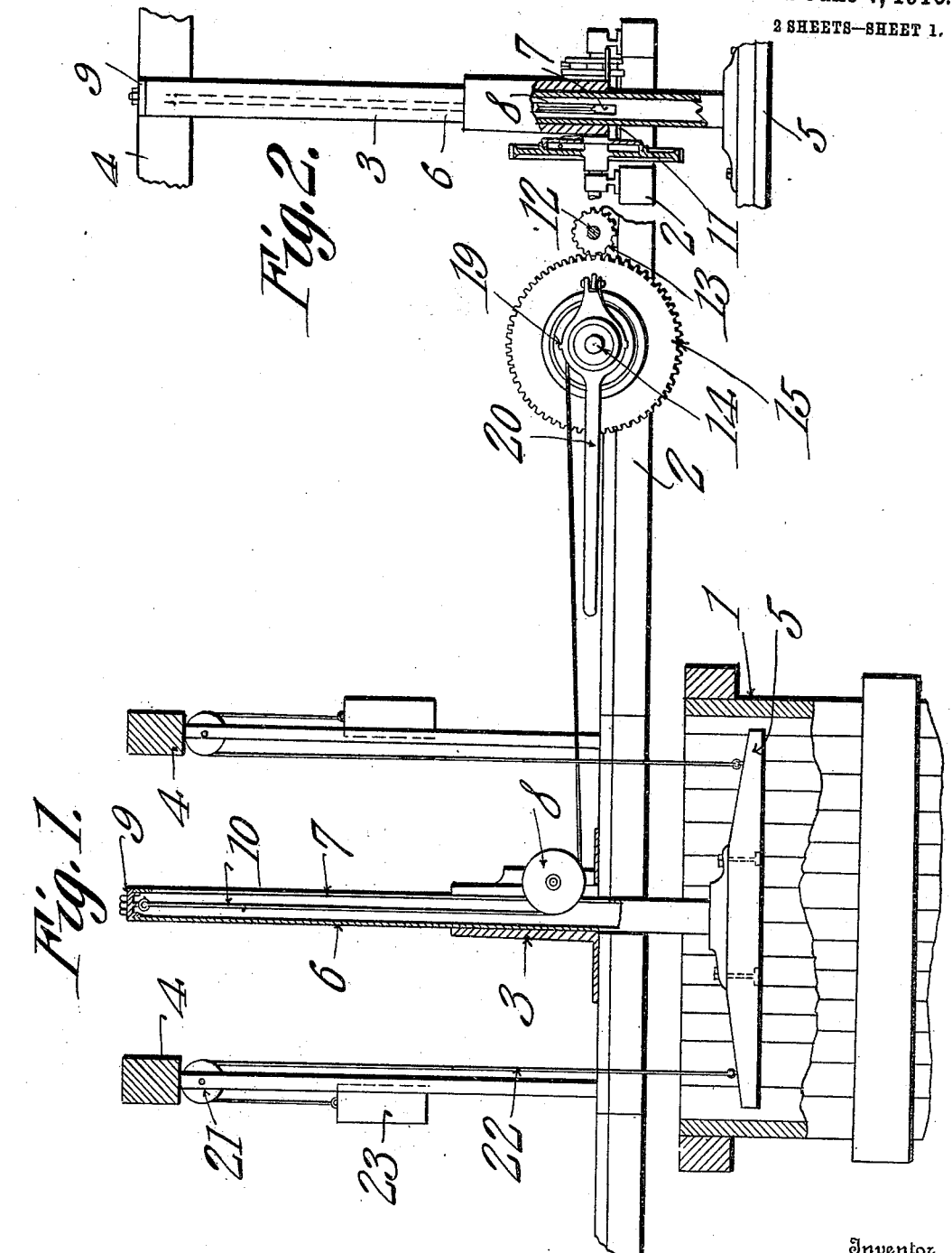
Witnesses
E. J. Stewart
J. F. Lawson
Inventor
Albert S. Dixon.
By C. A. Snow & Co.
Attorneys

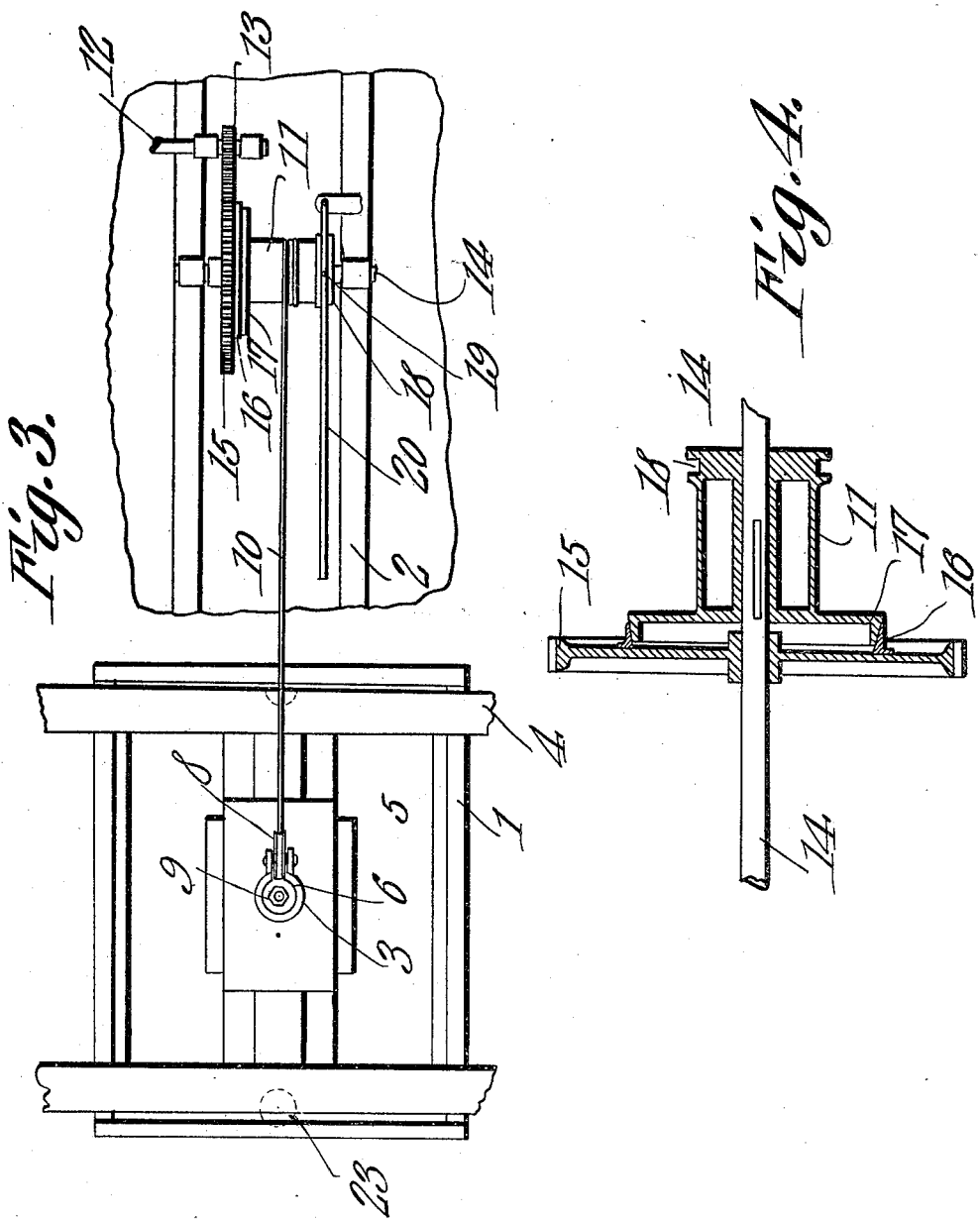

UNITED STATES PATENT OFFICE.

ALBERT S. DIXON, OF AUSTIN, TEXAS.

COTTON-PACKER.

960,850. Specification of Letters Patent. Patented June 7, 1910.

Application filed November 13, 1909. Serial No. 527,894.

*To all whom it may concern:*

Be it known that I, ALBERT S. DIXON, a citizen of the United States, residing at Austin, in the county of Travis and State of Texas, have invented a new and useful Cotton-Packer, of which the following is a specification.

This invention has relation to cotton packers and it consists in the novel construction and arrangement of its parts hereinafter shown and described.

The object of the invention is to provide a simple and effective apparatus for packing cotton preparatory to baling the same and with this object in view the apparatus includes a plunger mounted for reciprocation above a box receptacle and having fixed at its center a hollow stem. The said stem is provided at one side with an elongated opening and a sheave is journaled upon a fixed support and has one portion projecting through the opening in the said stem whereby the inner portion of the periphery of the said sheave is in vertical alinement with the center of the stem or approximately so. A winding drum is mounted in the vicinity of the said stem and plunger and a cable is wound thereon and passes around the said sheave and up along the stem and is secured to the top of the same. Counterbalance weights are provided with supporting cables which are attached to the end portions of the said plunger and are adapted to raise the same as the cable which winds upon the said drum is slackened.

In the accompanying drawings,—Figure 1 is a side elevation of the cotton packer with parts broken away and with parts in section. Fig. 2 is an elevation of the same viewed at a right angle to the elevation shown in Fig. 1, and showing parts in section. Fig. 3 is a top plan view of the apparatus. Fig. 4 is a vertical sectional view of the winding drum.

The apparatus includes a box or receptacle 1 located under sills 2 upon which is mounted a guide 3. Beams 4 are located above the sills 2. A plunger 5 is arranged over the upper end of the box 1 and is adapted to move vertically within the said box. The said plunger 5 is provided with a vertically disposed hollow stem 6 which is centrally positioned upon the said plunger and which is provided at one side with an elongated slot 7. A sheave 8 is journaled upon a fixed portion of the sleeve 3 and the inner edge portion of the said sheave projects through the elongated slot 7 of the stem 6 so that the innermost point of the periphery of the said sheave is approximately the same vertical line as the center of the said stem. A cap 9 is mounted upon the top of the stem 6 and one end of a cable 10 is fixed to the center of the said cap, and the said cable extends down along the interior of the stem 6 around the under portion of the periphery of the sheave 8 and thence passes to a drum 11 about the periphery of which it is adapted to wind. A shaft 12 is journaled for rotation adjacent the said drum 11 and a gear wheel 13 is secured to the said shaft. The drum 11 is concentrically mounted upon a shaft 14 and gear wheel 15 meshes with the gear wheel 13 and is also mounted upon the said shaft 14. The wheel 15 is provided upon one side with friction flange 16 which is annular in configuration and the drum 11 is provided at one end with a friction flange 17 adapted to coöperate with the friction flange 16 upon the wheel 15. At its other end the drum 11 is provided with an annular groove 18 which receives pins 19 of a lever 20. By shifting the lever 20 it is apparent that the drum 11 may be moved longitudinally along the shaft 14 so that its friction flange 17 may be moved away from or toward the friction flange 16 upon the wheel 15. During the rotation of the shaft 12 and the pulley 13, the wheel 15 is in a constant state of rotation and, consequently when the drum 11 is shifted so that its friction flange 17 is brought into engagement with the friction flange 16, the said drum 11 will rotate in unison with the wheel 15. When this is done the cable 10 is wound upon the periphery of the drum 11 and the stem 6 is pulled down through the guide 3 and the plunger 5 descends into the box 1 and operates upon the material therein contained. At the end of the stroke of the said plunger, an operator swings the lever 20 so that the friction flange 17 of the drum 11 is moved out of engagement with the friction flange 16 upon the wheel 15 whereupon the drum 11 continues to rotate the said wheel 15.

Sheaves 21 are supported from the beams 4 and cables 22 pass over the said sheaves and are attached at their inner ends to the opposite sides of the plunger 5, and at their outer ends pendently support the weight 23. Thus it will be seen that the flange 17 of the drum 11 is moved out of engagement with the flange 16 of the wheel 15, the weight 23 begins to descend by gravity and the cable 22 passing over the sheave 21 draws the plunger 5 back to its normal elevated position. When this is done, more material may be placed in the box 1, and the operation above described may be repeated.

Having described the invention what I claim as new and desire to secure by Letters Patent is:—

1. In a cotton packer a guide, a plunger stem passing through the guide and being hollow and having one side provided with an elongated slot, a plunger attached to the stem, a journaled sheave having a portion projecting through the slot in the stem, a cable connected at one end with the upper portion of the stem and passing under the said sheave, means for drawing the cable, and means for raising the plunger.

2. In a packer, a guide, a hollow plunger stem slidably mounted therein and provided with an elongated slot, a plunger attached to the lower end of the stem, a journaled sheave having a portion projecting through the slot in the stem, a cable connected at one end with the stem at a point in alinement with its center and passing under the sheave, means for drawing the cable, and means for raising the plunger.

3. In a packer, a guide, a hollow plunger slidably mounted in the guide and having an elongated slot, a journaled sheave having a side portion projecting through said slot, the innermost point of the periphery of the sheave being in alinement with the center of the stem, a plunger attached to the lower end of the stem, a cable connected at one end with the stem at a point in alinement with its center and passing under the said sheave, means for drawing the said cable, and means for raising the plunger.

4. In a packer, a guide, a hollow stem slidably mounted in the guide and having an elongated slot, a plunger attached to the lower end of said stem, a journaled sheave having its side portion projecting through the slot in the stem, a cable connected at one end with the stem and extending along the interior of the same and under the sheave, means for drawing the cable, sheaves supported at the opposite sides of the plunger and above the same, cables passing over said sheaves and connected at their ends to the opposite sides of the plunger, and weights hanging from the other ends of said cables.

5. In a packer a guide, a hollow stem slidably mounted in the guide and having an elongated slot, a plunger attached to the lower end of said stem, a journaled sheave having a side portion projecting through the slot, the innermost point of the periphery of the said sheave being in alinement with the center of the stem, a cable connected at one end with the stem at a point in alinement with its center and passing under the sheave, means for drawing said cable, sheaves supported in elevated position at the opposite side of the stem, cables passing over said sheaves and secured at their inner ends to the opposite sides of the plunger, and weights hanging pendent from the other ends of the last said cables.

In testimony that I claim the foregoing as my own, I have hereto affixed my signature in the presence of two witnesses.

ALBERT S. DIXON.

Witnesses:
J. M. DAUGHERTY,
ERNST EBNER.